United States Patent Office 2,775,572
Patented Dec. 25, 1956

2,775,572

HIGH IMPACT STRENGTH PLASTIC COMPOSITION CONTAINING POLYVINYL ACETAL RESIN AND ETHYL ACRYLATE ELASTOMER

Charles F. Fisk, Clifton, N. J., assignor to United States Rubber Company, New York, N. Y., a corporation of New Jersey No Drawing. Application August 28, 1952,
Serial No. 306,946

6 Claims. (Cl. 260—45.5)

This invention concerns improved tough mixtures of certain resins and more particularly it concerns novel blends of polyvinyl acetal resins with certain ethyl acrylate polymers, characterized particularly by unusually high impact strength, in combination with great hardness and rigidity.

The invention is based on the unexpected discovery that admixture of polyethyl acrylate, or certain copolymers thereof, with polyvinyl acetal resins in certain proportions produces a hard, tough mixture having an impact strength far in excess of that of mixtures of these same materials in other proportions. More specifically, it has been found that addition of relatively minor amounts of certain ethyl acrylate polymers, within the range of from about 5 to 20 parts by weight of polyvinyl acetal resins, correspondingly in amount with the range of from about 95 to about 80 parts by weight, produces a remarkable improvement in impact strength.

The polyvinyl acetal resins employed in the invention are well known materials, typically derived by conventional methods from polyvinyl acetate by hydrolysis of the latter material, followed by reaction with an aldehyde. As is explained by Schildknecht in "Vinyl and Related Polymers" (published by John Wiley and Sons, Inc., New York, N. Y., in 1952) at page 358, high-polymer chemists use the term "polyvinyl acetals" to indicate polyvinyl alcohols which have had a major part of their hydroxyl groups condensed with aldehydes. One molecule of the aldehyde condenses with two hydroxyls to yield the acetal, and the resulting material is water resistant, in contrast to polyvinyl alcohol, which is water soluble (cf. page 490, "Handbook of Plastics," by Simonds et al., D. Van Nostrand, 2nd Edition, 1949). The final polyvinyl acetal resin is generally characterized by the viscosity of the polyvinyl acetate used as the starting material and the degree of acetate replacement by aldehyde. It has been found that the high impact strength phenomenon of the present invention is obtained to best advantage with those polyvinyl acetal resins in which the acetate replacement by aldehyde is relatively high, preferably well over about 75% (in terms of the nominal degree of replacement in accordance with the practice in the trade). The polyvinyl acetal resins are usually made from the lower alkyl aldehydes, such as formaldehyde, acetaldehyde and butyraldehyde. Polyvinyl formal and polyvinyl butyral constitute the commonest commercially available polyvinyl acetal resins and are preferred in the invention. Of these materials, polyvinyl formal represents the most preferred polyvinyl acetal resin for use in the invention. The polyvinyl acetals are thermoplastic resins; they are much used in coating and laminating, and they can also be molded into shaped articles. While they have many desirable physical characteristics, their impact strength is not as great as is required for certain uses. The impact strength of the polyvinyl acetals can be improved only slightly by addition of plasticizers, and this expedient results in a concomitant loss of rigidity and hardness. The present invention affords a means for increasing the impact strength of the polyvinyl acetals, without undue sacrifice of rigidity or hardness, by addition of small amounts of certain ethyl acrylate polymers.

The ethyl acrylate polymer employed in the invention may be polyethyl acrylate itself, or a copolymer of ethyl acrylate with isobutylene or vinyl 2-chloroethyl ether. Such copolymers preferably are derived from monomeric mixes containing from about 80 to 96% of the ethyl acrylate, and correspondingly from 20 to 4% of one of the said copolymerizable monoethylenically unsaturated monomers. Polyethyl acrylate or copolymers thereof with isobutylene or vinyl 2-chloroethyl ether may be prepared by conventional methods, such as are described, for example, by Mast et al., Ind. Eng. Chem., 36, 1022 (1944). These polymers and copolymers are saturated elastomers.

The acetal resin-ethyl acrylate polymer blends of the invention may be prepared by intimately mixing the polyvinyl acetal resin and the ethyl acrylate polymer in the required proportions in any suitable manner. The mixing equipment commonly used for working rubber or plastics, such as roll mills or internal mixers, is suitable for this purpose, and the mixing operation is facilitated by elevated temperatures. The milling temperatures commonly employed when compounding polyvinyl acetals, e. g., stock temperatures of about 300° to 350° F., may be employed to advantage. In general, it has been found that the present blends of acetal resin and ethyl acrylate polymer in the stated proportions possess unusually good processability and they can be readily mixed to a smooth consistency without exceeding a mixture temperature of about 300° to 350° F. This facility of mixing and processing is an important advantage of the present polyvinyl acetal resin blends. Similarly, the present blends can be molded easily at temperatures of about 300° to 350° F.

When a rubber mill is used, the ethyl acrylate polymer can be first banded by cold working on the mill, and then the unmelted polyvinyl acetal resin powder is added in the required proportions on the cool mill, thus forming a very dead and "baggy" sheet, after which the mill rolls are heated to about 300° F. Alternatively, the mill rolls may be already at a temperature of 300° F. or above when both the ethyl acrylate polymer and the acetal resin are added. In either case, the polyvinyl acetal resin melts and apparently dissolves in the ethyl acrylate polymer and the mixture thereafter generally hugs the mill tightly like an ordinary rubber compound. The blend can then be sheeted off the mill in a smooth, limp sheet, which becomes hard and horny on cooling. The material may be chopped up or ground to produce lumps or powder suitable for molding, extruding, or calendering at elevated temperatures. Test specimens can be prepared from this material by molding in a suitable mold at 330° F., and then cooling the mold. The material may be mixed with other compounding ingredients such as fillers, reinforcing agents, dyes, pigments, stabilizers, and the like. The materials are truly thermoplastic, and may be re-milled and re-molded without loss of proper ties. The molded products also remain soluble in organic solvents.

The most preferred mixtures of polyvinyl acetal resin with ethyl acrylate polymers coming within the scope of the invention are characterized by remarkably high impact strength of about 4 or more foot-pounds per inch of notch, as measured by the Izod notched sample method. Those skilled in the art will freely recognize 4 foot-pounds as a remarkable value for the impact strength of a hard plastic material, particularly in view of the fact that the polyvinyl acetal resin itself generally has an impact strength of less than 1 foot-pound. It will be understood that it is only remarkable for a plastic material to have such a high impact strength when the high impact strength is accompanied by a high modulus and high hardness. The present blends are hard and have a flexural modulus almost invariably considerably in excess of 100,000 pounds per square inch, so that they are definitely rigid materials. There is nothing unusual in high impact strength if the flexural modulus is much below 100,000 p. s. i., and particularly when below 50,000 p. s. i. When the modulus is so low the materials are definitely non-rigid and flexible, and the Izod impact test simply yields readings that numerically are high, but meaningless with respect to indicating the true toughness of the material. The flexural modulus of the material is conveniently measured by twisting a 0.1" x 0.5" x 4" molded sample at room temperature, using the torsion apparatus of Clash and Berg, as described in Industrial and Engineering Chemistry, 34, 1218 (1942).

Another advantage of the blends of the invention is that they are frequently quite transparent. This is perhaps the most surprising property of the present blends, and represents a most unusual advantage, since transparent plastic elastomer-resin mixtures that are hard and tough have never before been known, as far as the inventor is aware.

The following examples will serve to illustrate the invention in more detail. In the examples, all parts are expressed by weight.

EXAMPLE I

A commercial polyvinyl formal resin sold under the trade designation "Formvar 7/90" was added to a commercial polyethyl acrylate sold under the trade designation "Hycar PA," in the amounts shown in Table I below, and worked at 300° F. to form a smooth blend. Test specimens were molded from this material at 330° F., and the physical properties were measured, with the results noted in the table.

*Table I*

| Parts | | Impact Strength, ft. lbs./ in. notch | Rockwell Hardness | Shore D Hardness | Flexural Modulus, thousands of p. s. i | |
|---|---|---|---|---|---|---|
| Formvar 7/90 | Hycar PA | | | | 25° C. | 75° C. |
| 90 | 10 | 18.4 | 114R | 82 | 400 | 160 |
| 80 | 20 | 14.3 | 107R | 78 | 300 | 123 |

EXAMPLE II

The procedure of Example I was followed, but a laboratory preparation of polyethyl acrylate was used in place of the Hycar PA. The results are given in Table II. The polyethyl acrylate was prepared by polymerizing ethyl acrylate in emulsion for 7 hours at 90° C., coagulating, washing, and drying. The polymer was an excellent rubber, was completely soluble in methyl ethyl ketone, and had a 212° F. Mooney viscosity of 28.

*Table II*

| Parts | | Impact Strength, ft. lbs./ in. notch | Rockwell Hardness | Shore D Hardness | Flexural Modulus, thousands of p. s. i. | |
|---|---|---|---|---|---|---|
| Formvar 7/90 | Polyethyl Acrylate | | | | 25° C. | 75° C. |
| 90 | 10 | 17.4 | 115R | 84 | 432 | ------ |
| 80 | 20 | 11.1 | 108R | 82 | 364 | ------ |

The blend containing 10 parts of polyethyl acrylate was transparent.

EXAMPLE III

This example was similar, except that there was used an ethyl acrylate and vinyl 2-chloroethyl ether copolymer, sold under the trade designation "Hycar PA-21." Hycar PA-21 is the copolymer experimentally identified as Lactoprene EV, and having a 95/5 ration of the previously mentioned monomers. The rubbery copolymer has a density of 1.09, is soluble in methyl ethyl ketone; although it is a saturated rubber it can be vulcanized through its active halogen center with a wide range of curing agents.

*Table III*

| Parts | | Impact Strength, ft. lbs./ in. notch | Rockwell Hardness | Shore D Hardness | Flexural Modulus, thousands of p. s. i. | |
|---|---|---|---|---|---|---|
| Formvar 7/90 | Hycar PA-21 | | | | 25° C. | 75° C. |
| 90 | 10 | 10.3 | 116R | 83 | 404 | 167 |
| 80 | 20 | 10.8 | 117R | 78 | 329 | 123 |

EXAMPLE IV

Here a copolymer containing 84% (in the product) of ethyl acrylate and 16% of isobutylene was employed.

*Table IV*

| Parts | | Impact Strength, ft. lbs./ in. notch | Rockwell Hardness | Shore D Hardness | Flexural Modulus, thousands of p. s. i. | |
|---|---|---|---|---|---|---|
| Formvar 7/90 | Ethyl Acrylate- Isobutylene Copolymer | | | | 25° C. | 75° C. |
| 90 | 10 | 16.5 | 114R | 82 | 405 | 141 |
| 80 | 20 | 7.4 | 96R | 77 | 310 | 83 |

The blend containing 10% of the ethyl acrylate-isobutylene copolymer was transparent.

EXAMPLE V

Additional data on blends prepared in the same manner are as given in Table V, below.

*Table V*

BLENDS OF FORMVAR 7/90 WITH ETHYL ACRYLATE ELASTOMERS

| Elastomer | Resin/ Rubber | Impact [1] | Rockwell | Shore D | Flexural Modulus [2] | Appearance [3] | |
|---|---|---|---|---|---|---|---|
| | | | | | | Trans. | Cloud. |
| Hycar PA | 95/5 | 2.5 | 121R | 86 | 450 | Yes | VSC |
| Hycar PA-21 | 95/5 | 4.1 | 120R | 85 | 440 | Yes | ------ |
| Do | 90/10 | 14.3 | 118R | 84 | 370 | No | ------ |
| Do | 85/15 | 13.7 | 114R | 83 | 370 | No | ------ |
| Do | 80/20 | 3.7 | 103R | 81 | 210 | No | ------ |
| Do | 70/30 | 1.6 | 82R | 76 | 200 | No | ------ |
| Polyethyl acrylate | 95/5 | 8.2 | 121R | 86 | 430 | Yes | SC |
| Do | 80/20 | 4.9 | 108R | 81 | 320 | No | ------ |
| Do | 70/30 | 1.6 | 87R | 77 | 240 | No | ------ |

[1] Foot-pounds per inch of notch at 25° C.
[2] In thousands of p. s. i. at 25° C.
[3] VSC=very slightly cloudy; SC=slightly cloudy; C=cloudy.

The acetal resin used in this example had a nominal acetate replacement value of 90%. The figures 7/90 in the designation "Formvar 7/90" indicate that the acetal resin was derived from a polyvinyl acetate having a viscosity of 7 centipoises (for a benzene solution containing 86 grams per liter), and that the reaction of the hydrolyzed polyvinyl acetate with formaldehyde was carried to the extent of 90% replacement by the aldehyde. However, the percentage replacement figure, as designated by the manufacturer, is evidently merely a nominal figure adopted for convenience; as the manufacturer's published analysis of the polyvinyl formal reveals a polyvinyl alcohol content of 7% and a polyvinyl acetate content of 11%, and the remainder polyvinyl formal, in the polymer chain.

The blends of the foregoing examples are many times tougher than the polyvinyl formal resin itself. The desired definite improvement in impact strength is obtained only when the ethyl acrylate polymer constitutes about 5 to 20% of the mixture of acetal resin and ethyl acrylate polymer. It should be emphasized that the blends within this range are definitely rigid materials, that is, the flexural modulus is of the order of at least about 100,000 p. s. i. This is adequate to permit use of the material in fabricating rigid articles, which are commonly considered to require a flexural modulus of at least about 100,000 p. s. i. for adequate rigidity.

The high impact blends of the invention are definitely hard materials. In fact, the blends are believed to be harder than any other known tough plastics. A molding, ⅛ inch thick, of the stock of Example I is so tough that it can be struck hard with a hammer without fracture and yet it is so hard that it cannot be scratched or marked with the fingernail.

The present blends are particularly outstanding with respect to heat aging, light aging, and weather aging.

In all cases it has been determined that the desired increase in impact strength is obtainable according to the invention only when the polyvinyl acetal resin is characterized by a high degree of ester replacement (i. e., replacement of acetate groups by aldehyde groups). Thus, polyvinyl acetate itself, or polyvinyl alcohol itself, or copolymers of polyvinyl acetate and polyvinyl alcohol, do not produce the desired effect. The most favorable results are obtained with those polyvinyl acetals having the highest degree of conversion of acetate to aldehyde, and in any case it is essential to employ a polyvinyl acetal characterized by at least about 75% nominal replacement of the original acetate groups by the respective aldehyde groups. More preferably, the polyvinyl acetal resin used in the invention should have a nominal replacement of 80% or more. In certain cases, especially in the case of polyvinyl acetal itself, it is even more preferred that the nominal replacement be at least 90%, ranging up to as substantially complete replacement as is generally obtainable.

It should also be noted that the desired high impact strength is obtainable only with polyethyl acrylate or copolymers of ethyl acrylate with isobutylene or vinyl 2-chloroethyl ether, as described. Thus, the high impact strength is not obtained if polymethyl acrylate; polybutyl acrylate; polyoctyl acrylate; butyl acrylate-acrylonitrile copolymer; butyl acrylate-isobutylene copolymer; butyl acrylate-vinyl ethyl ether copolymer; ethyl acrylate-vinyl ethyl ether copolymer; or methyl acrylate-vinyl butyl ether copolymer, are substituted for the aforesaid ethyl acrylate polymers.

The invention is all the more unexpected in view of the fact that polyethyl acrylate has heretofore been regarded as incompatible with polyvinyl formal.

The blends of the invention may be substituted to great advantage for the usual rubber or plastic compositions, or even for metals or other materials, in many applications where toughness is a requirement. Thus, the present mixtures may be used to fabricate parts for machines, such as gears and cams; parts for textile machinery such as bobbins, shuttles, pickers, etc.; containers and pipes, especially for chemical and the like operations where resistance to corrosive substances is desired, as in filter press plates and tumbling barrels for plating operations; electrical parts, such as terminal blocks, telephones, and protective casings for cable joints; as well as tote boxes and trays; luggage; radio cabinets; furniture; phonograph records; paneling or covering for interior and exterior walls and surfaces of buildings, railroad cars or ships; automobile parts such as steering wheels, door panels, and seat parts; roller skate wheels; protective equipment such as helmets, goggles, visors, face shields, and armor, including body armor; windows or port coverings; printing plates; tools; die cutting blocks; washing machine parts such as bearings and impellers; and numerous other articles, as will be evident to those skilled in the art. The compositions of the invention may be expanded or blown to make cellular or sponge material. The blends may be laminated or otherwise reinforced, as with fibers or fabrics, if desired, in making the foregoing or other articles, although frequently the strength of the blends will be adequate without reinforcement.

Having thus described my invention, what I claim and desire to protect by Letters Patent is:

1. A hard, tough, rigid thermoplastic mixture characterized by an Izod notched impact strength of at least 4 foot-pounds per inch of notch and a flexural modulus in excess of 100,000 pounds per square inch comprising an intimate blend of about 5 to 20% by weight of an ethyl acrylate elastomer selected from the group consisting of polyethyl acrylate, a copolymer of 80–96% of ethyl acrylate with 4–20% of isobutylene, and a copolymer of 80–96% of ethyl acrylate with 4–20% of vinyl 2-chloroethyl ether and correspondingly about 95 to 80% of a polyvinyl acetal resin characterized by at least 75% replacement by aldehyde groups of the acetate ester groups in the polyvinyl acetate from which said resin is derived.

2. A hard, tough, rigid thermoplastic mixture characterized by an Izod notched impact strength of at least 4 foot-pounds per inch of notch and a flexural modulus in excess of 100,000 pounds per square inch comprising an intimate blend of from 5 to 20% by weight of polyethyl acrylate and correspondingly from 95 to 80% of a polyvinyl acetal resin characterized by at least 75% replacement by aldehyde groups of the acetate ester groups in the polyvinyl acetate from which said resin is derived.

3. A hard, tough, rigid thermoplastic mixture characterized by an Izod notched impact strength of at least 4 foot-pounds per inch of notch and a flexural modulus in excess of 100,000 pounds per square inch comprising an intimate blend of from 5 to 20% by weight of a copolymer of 80–96% of ethyl acrylate with 4–20% of isobutylene and correspondingly from 95 to 80% of a polyvinyl acetal resin characterized by at least 75% replacement by aldehyde groups of the acetate ester groups in the polyvinyl acetate from which said resin is derived.

4. A hard, tough, rigid thermoplastic mixture characterized by an Izod notched impact strength of at least 4 foot-pounds per inch of notch and a flexural modulus in excess of 100,000 pounds per square inch comprising an intimate blend of about 5 to 20% by weight of an ethyl acrylate elastomer selected from the group consisting of polyethyl acrylate, a copolmer of 80–96% of ethyl acrylate with 4–20% of isobutylene, and a copolymer of 80–96% of ethyl acrylate with 4–20% of vinyl 2-chloroethyl ether and correspondingly from 95 to 80% of polyvinyl butyral resin characterized by at least 75% replacement by aldehyde groups of the acetate ester groups in the polyvinyl acetate from which said resin is derived.

5. A hard, tough, rigid thermoplastic mixture characterized by an Izod notched impact strength of at least 4 foot-pounds per inch of notch and a flexural modulus in excess of 100,000 pounds per square inch comprising an intimate blend of from 5 to 20% by weight of an ethyl acrylate elastomer selected from the group consisting of polyethyl acrylate, a copolymer of 80–90% of ethyl acrylate with 4–20% of isobutylene, and a copolymer of 80–96% of ethyl acrylate with 4–20% vinyl 2-chloroethyl ether and correspondingly from 95 to 80% of polyvinyl formal resin, characterized by at least 80% replacement by aldehyde groups of the acetate ester groups in the polyvinyl acetate from which said resin is derived.

6. A hard, tough, rigid thermoplastic mixture characterized by an Izod notched impact strength of at least 4 foot-pounds per inch of notch and a flexural modulus in excess of 100,000 pounds per square inch comprising an intimate blend of from 5 to 20% by weight of an ethyl acrylate elastomer selected from the group consisting of polyethyl acrylate, a copolymer of 80–96% of ethyl acrylate with 4–20% of isobutylene, and a copolymer of 80–96% of ethyl acrylate with 4–20% of vinyl 2-chloroethyl ether and correspondingly from 95 to 80% of polyvinyl formal resin, characterized by at least 90% replacement by aldehyde groups of the acetate ester groups in the polyvinyl acetate from which said resin is derived.

References Cited in the file of this patent

UNITED STATES PATENTS

| | | |
|---|---|---|
| 2,326,543 | Macht | Aug. 10, 1943 |
| 2,328,057 | Coulter | Aug. 31, 1943 |
| 2,419,202 | D'Alelio | Apr. 22, 1947 |

FOREIGN PATENTS

| | | |
|---|---|---|
| 727,955 | Germany | Nov. 17, 1942 |

OTHER REFERENCES

Ind. Eng. Chem., 31, 941–945, August 1939.